United States Patent
Behrens

(10) Patent No.: US 9,792,511 B2
(45) Date of Patent: Oct. 17, 2017

(54) METHOD FOR THE OPERATION OF AN ASSISTANCE SYSTEM OF A MOTOR VEHICLE, AS WELL AS ASSISTANCE SYSTEM

(71) Applicant: Conti Temic microelectronic GmbH, Nuremberg (DE)

(72) Inventor: Alexander Behrens, Markdorf (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 81 days.

(21) Appl. No.: 14/808,257

(22) Filed: Jul. 24, 2015

(65) Prior Publication Data
US 2016/0026882 A1 Jan. 28, 2016

(30) Foreign Application Priority Data
Jul. 25, 2014 (DE) .................... 10 2014 214 711

(51) Int. Cl.
*G06K 9/00* (2006.01)
*G06K 9/48* (2006.01)
(52) U.S. Cl.
CPC ........... *G06K 9/00818* (2013.01); *G06K 9/48* (2013.01)
(58) Field of Classification Search
None
See application file for complete search history.

(56) References Cited

U.S. PATENT DOCUMENTS

| 2001/0036293 A1* | 11/2001 | Laumeyer | G06K 9/00818 382/104 |
| 2005/0270289 A1* | 12/2005 | Momose | G06T 11/203 345/443 |
| 2009/0110286 A1* | 4/2009 | Nunn | G06K 9/3233 382/190 |
| 2010/0067805 A1* | 3/2010 | Klefenz | G06K 9/4633 382/201 |
| 2014/0189291 A1 | 7/2014 | Yang et al. | |
| 2016/0210520 A1* | 7/2016 | Koide | G06K 9/00818 |

FOREIGN PATENT DOCUMENTS

JP 2014-127162 A 7/2014

OTHER PUBLICATIONS

Office Action in German Patent Application No. 10 2014 214 711.5, dated Jun. 17, 2015, 6 pages, with English translation, 4 pages.
Hassan Shojania, "Real-Time Traffic Sign Detection", Project Report, Fall 2003, pp. 1 to 24, accessible in the internet as of Dec. 11, 2006 at //web.archive.org/web/20061211044851/http://hassan.shojania.com/; accessed on Jun. 16, 2015.

(Continued)

*Primary Examiner* — Sean Conner
(74) *Attorney, Agent, or Firm* — W. F. Fasse

(57) ABSTRACT

A method is provided for operating a driver assistance system of a motor vehicle to detect a polygon-shaped (and especially rectangular) traffic sign with a number of edges. A camera acquires an image of the traffic sign. Within at least a portion of the image, a number of first line segments is determined, which is less than the number of edges of the traffic sign. Based on the first line segments, a reproduction of the traffic sign is identified.

13 Claims, 2 Drawing Sheets

(56) References Cited

OTHER PUBLICATIONS

Elena Cardarelli et al., "Road Signs Shapes Detection Based on Sobel Phase Analysis", IEEE Intelligent Vehicles Symposium, IV 2009, Xi'an China; Jun. 3-5, 2009; pp. 376 to 381.
Francisco Parada-Loira et al., "Local Contour Patterns for Fast Traffic Sign Detection", IEEE Intelligent Vehicles Symposium, IV 2010, University of California, San Diego, CA, USA; Jun. 21-24, 2010, pp. 1 to 6.
Franklin C. Crow, "Summed-Area Tables for Texture Mapping", Computer Graphics, vol. 18, No. 3, Jul. 1984, pp. 207 to 212.
Paul Viola et al., "Rapid Object Detection Using a Boosted Cascade of Simple Features", IEEE Computer Society Conference on Computer Vision and Pattern Recognition (CVPR), 2001, vol. 1, pp. 511 to 518.

* cited by examiner

METHOD FOR THE OPERATION OF AN ASSISTANCE SYSTEM OF A MOTOR VEHICLE, AS WELL AS ASSISTANCE SYSTEM

FIELD OF THE INVENTION

The invention relates a method for operating an assistance system of a motor vehicle and an assistance system of a motor vehicle.

BACKGROUND INFORMATION

Drivers of motor vehicles are informed of risks or prevailing legal provisions by means of traffic signs. For example, existing speed limits, restrictions on passing or street conditions are indicated with the aid of traffic signs. Also a traffic routing is represented by traffic signs, such as e.g. existence of a one-way street or a dead-end street as well as a prohibition of access into a defined street. Recently, motor vehicles are equipped with an increasing number of assistance systems to make the operation of motor vehicles easier for the drivers. For example assistance systems are known, which allow the detection of traffic signs. For this purpose, a region in front of the vehicle is recorded by means of a camera and a traffic sign shown there is determined.

To determine the traffic sign the produced image is verified as to whether it contains a known pattern, which represents a reproduction of the traffic sign. Round traffic signs here differ merely in the diameter, which can be adapted by means of a suitable scaling of the reproduction of the traffic sign. Rectangular traffic signs are a challenge, as they usually differ comparably distinctly in their height to width ratio. Thus, essentially quadratic traffic signs exist, but also traffic signs, with their width being 1.5 times their height. Also traffic signs are country-specific, so that within the assistance system a plurality of different traffic sign forms must be stored to guarantee proper operation. This is relatively elaborate and memory intensive.

Moreover, the produced image must be analyzed as to a presence of all stored traffic sign forms. This requires comparably high computing power, so that an evaluation of the detected image essentially cannot be realized in real time or only by means of a comparably cost-intensive computing unit. Therefore, not all images are detected, which would be detectable by means of a camera of the assistance system. As a consequence it is possible that a traffic sign is not detected by means of the assistance system and hence the driver of the motor vehicle is not informed about its presence.

SUMMARY OF THE INVENTION

An object of at least one embodiment of the invention is to indicate a method for operating an assistance system of a motor vehicle for detecting a polygon traffic sign and an assistance system, wherein the identification of the traffic sign within the detected image is effected in particular in a comparably time-saving and preferably comparably robust manner.

The above object can be achieved according to the invention in at least one embodiment of a method and in at least one embodiment of a driver assistance system as set forth herein.

By means of the method an assistance system of a motor vehicle is operated. The method and the assistance system here serve to detect a polygon traffic sign, which comprises a number of edges. A polygon traffic sign is in particular a traffic sign, whose outline is a polygon and for example a regular polygon. In particular, by means of the method a rectangular traffic sign is detected. By means of a camera an image of the traffic sign is detected. The camera is for example a mono or stereo camera and is preferably aligned towards a driving direction of the motor vehicle. Suitably, the image is digitalized here. Usefully, the camera comprises a chip for this purpose, for example a CCD- or a CMOS-chip.

In a further process step a number of first routes is determined within the detected image. A so-called "route" herein is in particular understood as referring to a straight line segment or segments lying on a straight line. The maximum length of each of the first routes, i.e. line segments, here is limited by the extension of the image. For example, at least one of the first routes may comprise a number of route sections, which are distanced from each other, however, lie on a common straight line. In this case, it should be understood that a "line segment" can be discontinuous with several sections thereof interspersed with breaks therebetween along a straight line. As a summary, each of the first routes or first line segments is in particular a portion of a straight line including one or more route sections, which are either connected or distanced from each other, but always lie on the common straight line. The number of the determined first routes or first line segments is smaller than the number of edges of the polygon traffic sign. In case a rectangular traffic sign is to be determined, as a consequence the number of the first routes is three or less. On the basis of the first routes a reproduction of the traffic sign is identified. Here, to each first route one of the edges of the traffic sign is assigned. In other words, each of the first routes corresponds to one of the imaged edges of the traffic sign. As a summary, the first routes represent the edges, wherein for identifying the reproduction of the traffic sign fewer first routes are used than the traffic sign comprises edges.

As a result, when identifying the reproduction of the traffic sign, at least one degree of freedom exists so that with a comparably low-quality image, for example with a reduced contrast, the reproduction can be surely or reliably identified. Further, a computing effort is reduced for determining the first routes in comparison with determining a number of first routes which corresponds to the number of edges, so the method can be carried out in a comparably time-saving manner. Further, due to the existing degree of freedom, it is not necessary to store the complete reproduction of the traffic sign in a memory, but the storing of defined sections thereof is sufficient to carry out the method. As an example an angle between two edges and/or a ratio of at least two edges of a defined traffic sign is stored within the assistance system. As soon as such signature, i.e. the stored angle and/or the ratio of the edges was determined within the image, the traffic sign is identified.

Preferably, after identification of the reproduction of the traffic sign in a further step further routes are determined, which represent the remaining imaged edges of the traffic sign. Alternatively or in combination thereto the symbol imaged by means of the traffic sign is identified. For example, a symbol representing the traffic sign is shown to a driver of the motor vehicle, for example by means of a head-up display, instrument cluster or the symbol is projected onto the front pane of the motor vehicle.

For example, the first routes within the image are determined by means of a gradient method. For this purpose, suitably the image is divided into a number of subsections and a defined value is assigned to each subsection. In case the image is available digitalized, each value suitably corresponds in particular to one pixel. The value is e.g. a brightness or color value. If the values of two adjacent subsections differ by more than a threshold value, it is assumed that between them there is at least a section of one of the first routes. In case a number of such sections were identified, which are preferably contacted and arranged in straight line, one of the first routes is identified. In this way in a comparably safe way the first routes within the image are determined. Suitably, the first routes are determined by means of a hysteresis method, in particular the canny edge operator.

In a particularly preferred embodiment of the invention the number of first routes is the number of edges of the traffic sign minus one. In this way, when identifying the reproduction of the traffic sign, there is exactly one degree of freedom. Hence, with a rectangular traffic sign exactly three first routes are determined. As a consequence it is also possible to identify reproductions of traffic signs, whose ratio from height to width is unknown or differs from a defined value, wherein, however, a faulty identification of further objects as traffic sign is avoided. For identification it is sufficient if the distance of the two first routes parallel to each other is known or if the image is appropriately scaled in a further process step.

Suitably, within the image a search or evaluation region is defined, within which the first routes are determined. In other words, not the complete image but rather only the search or evaluation region is checked for the presence of the first routes. In this way the speed, with which the method can be carried out, is further increased. For example, the search or evaluation region is constant or is adapted in particular depending on current requirements, such as a speed or trajectory of the motor vehicle. As an alternative, or especially preferred in combination thereto, within the image a number of second routes is determined, wherein the number of the second routes is higher than the number of the first routes and in particular higher or equal to the number of the edges. From these second routes determined in this way the first routes are selected. In other words each of the first routes corresponds to one of the second routes. For example, at least one of the second routes or second line segments may comprise a number of route sections or line segment sections, which are distanced from each other, but lie on a common straight line. In other words each of the second routes or second line segments is in particular a straight running line segment with one or more sections, wherein the respective route sections are either connected or distanced from each other, and wherein, however, all route sections of each of the second routes always lie on a respective common straight line. Preferably, here all second routes are determined by means of a gradient method. The method is stopped in particular, in case within the first detected image not a defined number of second routes was determined. The method is stopped in particular, in case the number of the second routes is smaller than a predefined number of first routes. Alternatively, the method is stopped, if the gradient course falls below a threshold value with at least one of the second routes, in case a gradient method for determining the second routes is used. In particular merely such routes are used as first routes and/or second routes, which have a predefined minimum length. Suitably, the second routes are determined by means of a hysteresis method, in particular the canny edge operator.

In a particularly preferred embodiment of the invention all routes within the region are determined, for which in particular a gradient method is used. From this total number of routes the second routes are selected. In particular merely all substantially horizontally and/or vertically running routes within the region are determined and used as second routes. In particular merely those routes are used as second routes, which have a defined minimum length. Substantially horizontal or vertical means a horizontally or vertically running route, wherein an absolute deviation of e.g. up to 10°, 5°, 3°, 2° or 1° is included. As a result, also tilted, i.e. incorrectly positioned traffic signs are identified. Also a perspective distortion with a non-horizontal alignment in relation to the motor vehicle is compensated. As all such routes are used, the probability to correctly identify the reproduction of the traffic sign is increased. Besides, routes running in such way often represent artificial objects, including traffic signs.

In a particular embodiment, a number of rectangular search or evaluation shapes or areas is selected as a search or evaluation region. In other words the search or evaluation region consists of a number of rectangular shapes or areas, which e.g. are contacted or distanced from each other. Preferably, the rectangular shapes here are vertically or horizontally aligned. In this way, the image can be divided comparably easily into the region. Also the determination of the second routes is comparably easy, in case all horizontal and vertical routes within the region are used as second routes. Here, suitably within the vertically aligned rectangular shapes merely substantially vertically running routes and within the horizontally aligned rectangular shapes merely substantially horizontally running routes are determined. Under horizontally aligned rectangular shape in particular a rectangle is meant here, whose horizontal extension is larger than its vertical extension and whose edges are arranged horizontally or vertically.

Suitably, the size of the rectangular shapes or areas is changed, i.e. their width and/or height. In this way the probability is increased that one of the imaged edges of the traffic sign is located within one of the rectangular shapes, wherein not the complete image is analyzed as to the presence of such an edge. On the other hand it is also possible in this way to identify traffic signs which are incorrectly aligned, in case the edges are for example not exactly horizontally aligned and the rectangular shapes are arranged substantially horizontally.

In a particularly preferred embodiment of the invention the rectangular shapes or areas are arranged to form the overall search or evaluation region in a U-shape. In other words two of the rectangular shapes are arranged parallel to each other, however, spaced apart from one another at a distance, and a third rectangular shape is arranged on the free end and perpendicular to them. In particular, rectangular traffic signs are detected here and the number of the first routes is in particular three. Preferably, here the rectangular areas or shapes are aligned substantially horizontally or vertically. For example, the rectangular areas or shapes overlap in their end regions or in particularly preferred manner the rectangular shapes or areas are distanced from each other. In this way possible artifacts in edge regions of the reproduction of the traffic sign are disregarded, avoiding errors in the identification of the reproduction. Preferably, the parallel arranged rectangular shapes or areas run vertically, thus they comprise a larger extension in vertical direction than in horizontal direction.

The third rectangular shape comprises a larger extension in horizontal direction than in vertical direction. In particular within the vertically running rectangular shapes all substantially vertically running routes are determined and used as second routes, and within the horizontally running rectangular shape all horizontally running routes are used as second routes. The two vertically running edges of the traffic sign are not subject to perspective distortion in the reproduction so that the error rate is reduced. It is useful that the horizontally running rectangular shape is arranged above the vertically running rectangular shapes or is located at least in the region of an upper free end of the rectangular shapes, wherein the upper region is that part of the image, which displays a region of that environment, which is located above the region of the image, which is imaged within the vertical rectangular shapes. Hence it is made possible to determine by means of the vertically running rectangular shape the upper imaged edge of the traffic sign as one of the first routes. In case a gradient method is used, this is comparably error-free, as this edge mostly borders on the imaged sky, what leads to an increased contrast.

Usefully, exactly one of the first routes is assigned to each of the rectangular shapes. In other words the number of rectangular shapes corresponds to the number of the first routes. In this way it is made possible to select the size of the rectangular shapes to be comparably small, i.e. their surface, what increases the speed of the method. It is also made possible to position the rectangular shapes in that part of the image, which most likely contains one of the first routes. In case two vertically running rectangular shapes and a horizontally running rectangular shape are used as region, consequently two vertically running first routes and a horizontally running first route are used to identify the reproduction of the traffic sign.

The assistance system of a motor vehicle serves to detect a polygon traffic sign. Preferably, the assistance system comprises a camera, in particular a mono or stereo camera and in particular a computing unit. The assistance systems is provided and equipped to detect by means of a camera an image of the traffic sign and to determine within the detected image a number of first routes, wherein the number of the first routes is smaller than the number of the edges of the traffic sign. Based on the first routes a reproduction of the traffic sign is identified.

BRIEF DESCRIPTION OF THE DRAWINGS

In the following, exemplary embodiments of the invention will be apparent from the accompanying drawings, in which.

In all drawings like reference numbers represent like parts.

DETAILED DESCRIPTION OF EXAMPLE EMBODIMENTS OF THE INVENTION

Figure 1:
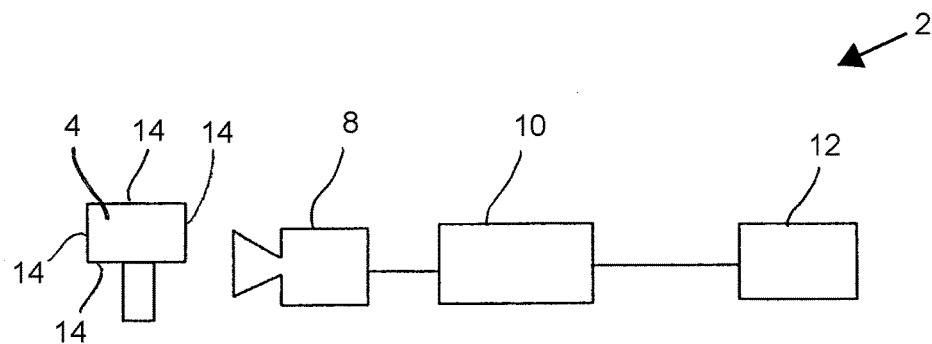
FIG. 1 shows schematically simplified an assistance system.

In FIG. 1, an assistance system 2 of a motor vehicle for detecting a polygon-shaped traffic sign 4 is shown in a simplified schematic manner. The assistance system 2 comprises a camera 8 with a CCD-chip and a computing unit 10 (e.g. including one or more computer processors and/or image processors, as well as a memory) and also a signal unit 12, which are coupled to each other in a fail-safe manner. Here, by means of the computing unit 10, the images produced with the aid of the camera 8 are analyzed, and the driver of the motor vehicle is informed by means of the signal device 12 about the presence of the traffic sign 4.

The signal unit 12 is a head-up display, by means of which this information is projected onto the front windshield of the motor vehicle.

Figure 2:
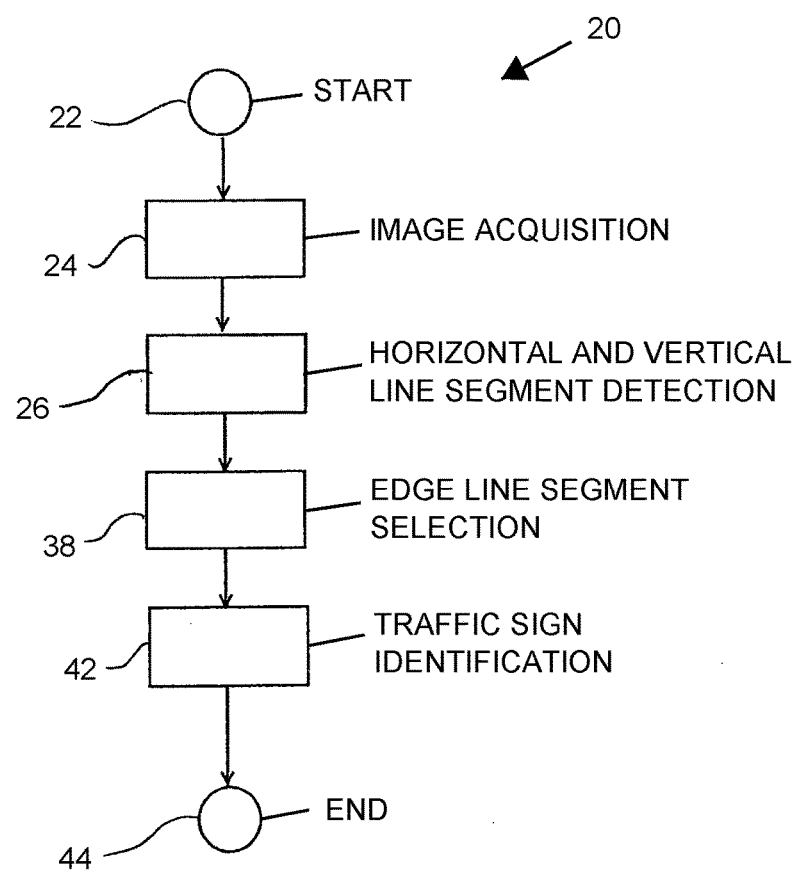
FIG. 2 shows a method for operating the assistance system, and FIGS. 3 and 4 each show a reproduction of the traffic sign.
Figure 3:
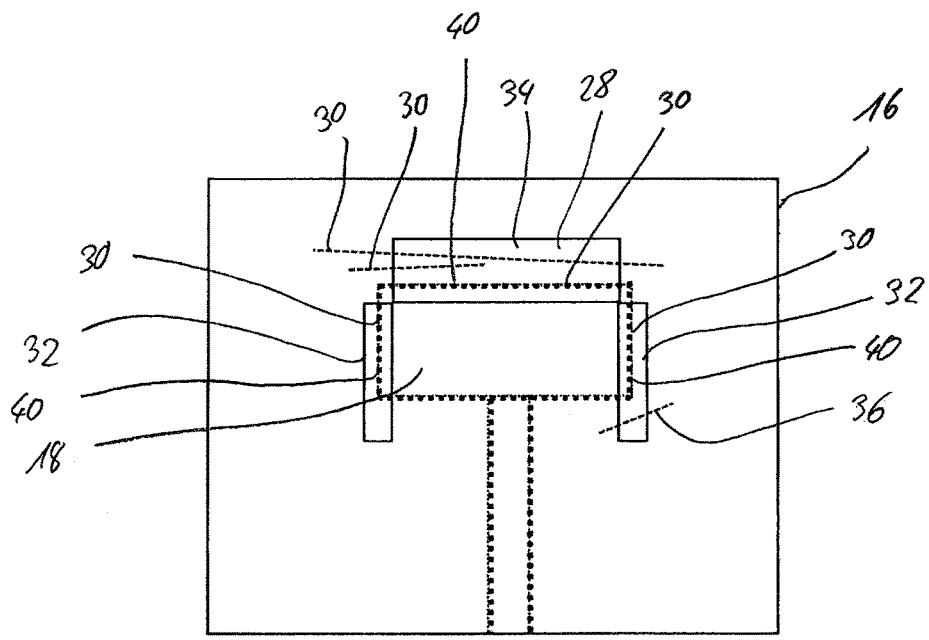
Figure 4:
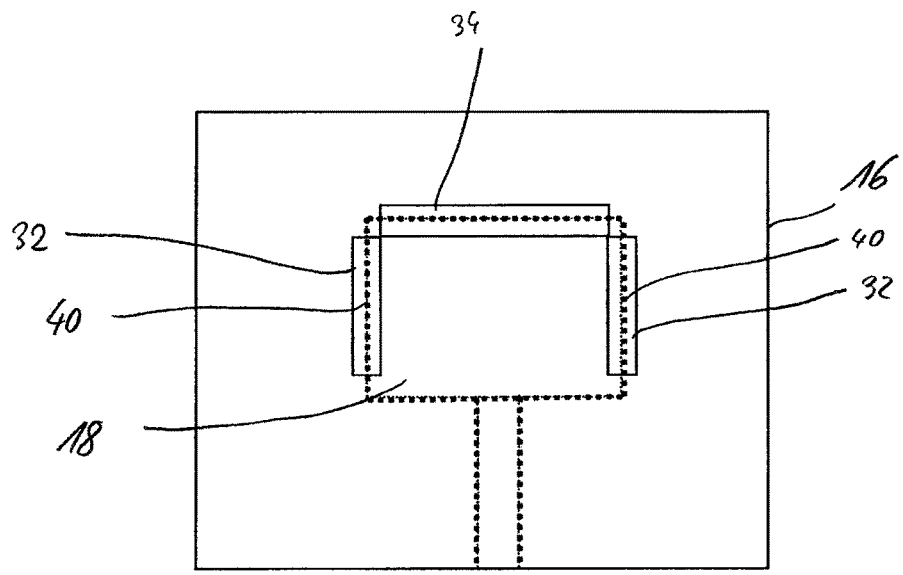

The traffic sign 4 is recorded by means of the camera 8, wherein the traffic sign 4 is rectangular and thus comprises four edges 14, which are arranged at right angles to each other. By means of the camera 8 an image 16 shown in FIG. 3 and FIG. 4 is produced, which contains a reproduction 18 of the traffic sign 4. For identifying the reproduction 18 within the image 16 a method 20 shown in FIG. 2 is carried out by means of the computing unit 10.

After a start event 22, which is e.g. the start of the motor vehicle and the beginning of electrical current feed of the assistance system 2, a first process step 24 of image acquisition is performed, wherein by means of the camera 8 the image 16 is detected and digitalized. In a subsequent second process step 26 of horizontal and vertical line segment detection, within a search or evaluation region 28 of the image 16 a number of second routes i.e. second line segments 30 is determined by means of a gradient method. The region 28 here is composed of two vertically running rectangular shapes or areas 32 and a horizontally running rectangular shape or area 34, which are arranged in a U-shape, wherein the inner edges, and particularly the inner corners, facing each other, of the rectangular shapes 32, 34 touch each other. The horizontal rectangular shape 34 is arranged above the two vertical rectangular shapes 32, i.e. in a section of the image 16, which shows a region, which is located above those regions, which are shown in the vertical rectangular shapes 32.

Within the horizontal rectangular shape 34 substantially all horizontally running routes or line segments are detected or determined as the second routes i.e. second line segments 30, whereas within the vertical rectangular shape 32 all substantially vertically running routes or line segments are detected or determined as second routes i.e. second line segments 30. A route 36, which does not fulfill this criterion of being substantially vertical, is not used as a second route or second line segment 30.

In a third process step 38 of edge line segment selection, three first routes i.e. first line segments 40 are selected from the second routes i.e. second line segments 30. Here, one of the first routes 40 is respectively assigned to each one of the rectangular shapes 32, 34. In other words, from all second routes i.e. second line segments 30 located within one of the rectangular shapes 32, 34, exactly one of them is determined as the first route or first line segment 40 of this respective rectangular area. Here, for example, the length of the second route 30 and/or its characteristic strength and/or its orientation and/or its position is used as a criterion for being selected as the first route 40.

On the basis of the first routes 40 determined in this way, in a fourth process step 42 of traffic sign identification, the reproduction 18 of the traffic sign 4 is identified, wherein each of the first routes 40 is used as a reproduction of each edge 14 of the traffic sign 4. The region between or bounded by the first routes 40 thus corresponds to the reproduction 18 of the traffic sign 4. Here, also an identification of a reproduction 18 of a traffic sign 4 of other having a differently proportioned rectangular shape as shown in FIG. 4 is possible, of which the lower edge 14 is moved downwards and which consequently has an enlarged surface area and a different height-to-width ratio compared to the traffic sign shown in FIG. 3. In this case in FIG. 4, the imaged vertical edges 14 do not end within the vertical rectangular shapes 32 but instead extend downwardly beyond the region 28 on the edges opposite the horizontally arranged rectangular shape

34. Here, this region of the imaged edges 14 of the traffic sign 4 is no longer determined as a first route 40. In contrast to the image 16 shown in FIG. 3, moreover in the image 16 shown in FIG. 4 the method 20 is modified, wherein merely the surface area of the horizontally running rectangular shape 34 was changed. The latter was reduced in its height, thus accelerating the method 20.

After successful identification of the reproduction 18 of the traffic sign 4 the method 20 is terminated in a further process step 44. Subsequent thereto a further method for reading the traffic sign 4 is carried out, wherein that section of the image 16 is analyzed, which is located between the first routes 40. Depending on the meaning and/or environment of the motor vehicle and on the driving style of the driver of the motor vehicle the signal device 12 is controlled and a pictogram symbolizing the traffic sign 4 is projected onto the front pane of the motor vehicle.

The invention is not restricted to the above described exemplary embodiments. Moreover, also other variants of the invention can be derived by the skilled person without leaving the subject-matter of the invention. In particular, furthermore all individual features, which were described with reference to the exemplary embodiments, can be combined with each other also in other way without leaving the subject-matter of the invention.

LIST OF REFERENCE NUMERALS

2 assistance system
4 traffic sign
8 camera
10 computing unit
12 signal device
14 edge
16 image
18 reproduction
20 method
22 start event
24 first process step
26 second process step
28 region
30 second route
32 vertical rectangular shape
34 horizontal rectangular shape
36 route
38 third process step
40 first route
42 fourth process step
44 end

The invention claimed is:

1. A method of operating a driver assistance system of a motor vehicle for detecting a rectangular traffic sign bounded by four edges in an environment outside of the motor vehicle, comprising steps:
   with a camera of the driver assistance system, acquiring an image of the traffic sign;
   with a computing unit of the driver assistance system, analyzing only a portion of the image which comprises two vertically longitudinally extending rectangular areas that are arranged parallel and spaced apart relative to one another, and one horizontally longitudinally extending rectangular area that is arranged perpendicular to and in a spacing distance between the two vertically longitudinally extending rectangular areas, and thereby determining exactly three first line segments in the portion of the image of the traffic sign by detecting at least one substantially horizontal second line segment that exists in the horizontally longitudinally extending rectangular area in the image, detecting substantially vertical second line segments that exist in the vertically longitudinally extending rectangular areas in the image, and determining the three first line segments by selecting as the first line segments, a respective one of the second line segments that best satisfies at least one prescribed criterion in each one of the rectangular areas; and
   with the computing unit, identifying a reproduction of the traffic sign based on and dependent on the three first line segments that were determined.

2. The method according to claim 1, wherein the analyzing of the portion of the image of the traffic sign comprises performing a gradient method to determine the first line segments in the image.

3. The method according to claim 1, wherein the second line segments comprise all of the substantially horizontal line segments and all of the substantially vertical line segments that exist within the rectangular areas in the image of the traffic sign.

4. The method according to claim 1, further comprising changing respective sizes of the rectangular areas.

5. The method according to claim 1, wherein the rectangular areas are arranged in a U-shape with respect to one another.

6. The method according to claim 5, wherein the U-shape is an upside-down U-shape, and wherein the horizontally extending rectangular area is located above the vertically extending rectangular areas to form the upside-down U-shape.

7. A driver assistance system of a motor vehicle for detecting a rectangular traffic sign bounded by four edges in an environment outside of the motor vehicle, said driver assistance system comprising:
   a camera configured and adapted to acquire an image of the traffic sign, and
   a computing unit configured and adapted to analyze only a portion of the image which comprises two vertically longitudinally extending rectangular areas that are arranged parallel and spaced apart relative to one another, and one horizontally longitudinally extending rectangular area that is arranged perpendicular to and in a spacing distance between the two vertically longitudinally extending rectangular areas, and thereby to determine exactly three first line segments in the portion of the image of the traffic sign by detecting at least one substantially horizontal second line segment that exists in the horizontally longitudinally extending rectangular area in the image, detecting substantially vertical second line segments that exist in the vertically longitudinally extending rectangular areas in the image, and determining the three first line segments by selecting as the first line segments, a respective one of the second line segments that best satisfies at least one prescribed criterion in each one of the rectangular areas, and wherein the computing unit is further configured and adapted to identify a reproduction of the traffic sign based on and dependent on the three first line segments that were determined.

8. The driver assistance system according to claim 7, further comprising a display device configured and arranged to display the reproduction of the traffic sign or a symbol based on the reproduction of the traffic sign.

9. The method according to claim 1, further comprising, with a display device of the driver assistance system, displaying the reproduction of the traffic sign or a symbol based on the reproduction of the traffic sign.

10. The method according to claim 1, wherein the three first line segments respectively correspond to three of the four edges of the rectangular traffic sign.

11. The method according to claim 1, wherein the edges of the traffic sign include two substantially horizontal edges and two substantially vertical edges, and the two substantially vertical edges of the traffic sign in the image are partially within, longer than and extend out of the vertically extending rectangular areas.

12. The method according to claim 1, wherein the edges of the traffic sign include two substantially horizontal edges and two substantially vertical edges, and each one of the two substantially vertical edges of the traffic sign in the image is respectively shorter than and has an end terminating within a respective one of the vertically extending rectangular areas.

13. The method according to claim 1, wherein the method is not able to detect and not able to determine a height-to-width ratio of the rectangular traffic sign.

\* \* \* \* \*